United States Patent [19]

Dewitz

[11] Patent Number: 4,943,190
[45] Date of Patent: Jul. 24, 1990

[54] AERATION TUBE DISCHARGE CONTROL DEVICE WITH VARIABLE FLUIDIC VALVE

[75] Inventor: Thomas S. Dewitz, Houston, Tex.
[73] Assignee: Shell Oil Company, Houston, Tex.
[21] Appl. No.: 209,605
[22] Filed: Jun. 21, 1988
[51] Int. Cl.⁵ .............................................. F23D 1/00
[52] U.S. Cl. .................................... 406/134; 406/137
[58] Field of Search ................. 406/91, 119, 123, 134, 406/136–138, 144–146

[56] References Cited

U.S. PATENT DOCUMENTS

| | | | |
|---|---|---|---|
| 699,405 | 5/1902 | Newhouse . | |
| 2,115,023 | 4/1938 | Kennedy et al. | 302/53 |
| 2,400,194 | 5/1946 | Day et al. | 196/52 |
| 2,499,766 | 3/1950 | MacLeod | 302/27 |
| 2,568,379 | 9/1951 | Berg | 183/4.2 |
| 2,631,759 | 3/1953 | Hoopes | 222/193 |
| 2,715,551 | 8/1955 | Kiernan | 302/55 |
| 2,794,686 | 1/1957 | Anselman et al. | 302/24 |
| 2,806,781 | 9/1957 | Shepherd et al. | 75/53 |
| 3,001,829 | 9/1961 | Saint-Martin | 302/53 |
| 3,007,744 | 11/1961 | Ward et al. | 302/53 |
| 3,053,420 | 9/1962 | Saint-Martin | 406/91 |
| 3,121,593 | 2/1964 | McIlvaine | 302/53 |
| 3,159,432 | 12/1964 | Ostrowski et al. | 302/53 |
| 3,173,725 | 3/1965 | Dietert | 406/91 |
| 3,230,016 | 1/1966 | Gilbert et al. | 302/53 |
| 3,261,379 | 7/1966 | Stockel et al. | 406/124 |
| 3,285,739 | 11/1966 | Christensen | 75/130 |
| 3,289,396 | 12/1966 | Anderson | 55/385 |
| 3,367,724 | 2/1968 | Emery et al. | 302/53 |
| 3,411,832 | 11/1968 | Garreau et al. | 302/53 |
| 3,424,352 | 1/1969 | Schlink | 222/195 |
| 3,479,093 | 11/1969 | Hale | 302/40 |
| 3,720,351 | 3/1973 | Coulter et al. | 222/1 |
| 3,822,919 | 7/1974 | Strom | 302/47 |
| 3,994,702 | 11/1976 | Schweimanns et al. | 48/197 R |
| 4,018,588 | 4/1977 | Hardy | 65/19 |
| 4,049,394 | 9/1977 | Gernhardt et al. | 48/62 R |
| 4,067,623 | 1/1978 | Klein et al. | 302/53 |
| 4,381,924 | 5/1983 | Schmidt | 48/197 R |
| 4,482,275 | 11/1984 | Shinozaki et al. | 406/12 |
| 4,529,336 | 7/1985 | Shinozaki et al. | 406/14 |
| 4,693,189 | 9/1987 | Powers | 406/137 |

FOREIGN PATENT DOCUMENTS 98030  7/1980 Japan .
102431  6/1982 Japan .
107316  7/1982 Japan .

OTHER PUBLICATIONS

Monitor Manufacturing, Aeration Products Group–"Monitor Aeration Devices" (sales brochure–no date available).

Primary Examiner—Sherman D. Basinger
Assistant Examiner—Edwin L. Swinehart

[57] ABSTRACT

The invention is directed to a method and apparatus for establishing and maintaining a uniform mass flow rate of particulate solids and gas mixture from a container to a receiving reactor. A preferred embodiment utilizes a selectively movable aeration tube suspended in the particulate mixture and serving as a fluidic valve to maintain a uniform mass flow rate. A portion of the aeration gaseous fluid may be directed upward in aid of such flow.

20 Claims, 2 Drawing Sheets

AERATION TUBE DISCHARGE CONTROL DEVICE WITH VARIABLE FLUIDIC VALVE

Related Applications

This invention is related to Assignee's patent applications Ser. No. 355,860 filed May 18, 1989 and which is a continuation of Ser. No. 098,161 (now abandoned); Ser. No. 098,178 (now U.S. Pat. No. 4,853,003); and Ser. No. 098,588 (now U.S. Pat. No. 4,830,545), all filed on Sept. 18, 1987; and to copending applications Ser. No. 209,602; Ser. No. 209,603; and Ser. No. 209,604, all filed concurrently herewith.

BACKGROUND OF THE INVENTION

Conventional coal feed systems using gravity flow of solids, such as in a coal feed to coal-fired boilers, can tolerate major fluctuations in the coal mass flow rate and suspension density.

Various devices have been built for discharging substances which tend to flow easily by gravity, such as grain coal. While devices such as those disclosed in U.S. Pat. Nos. 3,289,396, 3,367,724, 4,529,336, 3,424,352, and 4,067,623 are concerned with providing "efficient discharge" of particulate materials from bulk storage tanks and avoiding bridging and incomplete discharging from such tanks, these devices do not maintain a uniform ma-s flow rate of particulate solids and gas mixture discharged in a uniform manner to a receiving reactor.

The present invention is directed to overcoming this problem in the art.

Applicant is not aware of any prior art which, in his judgment as a person skilled in this particular art, would anticipate or render obvious the present invention. However, for the purpose of fully developing the background of the invention, and establishing the state of requisite art, the following art, in addition to Assignee's above-identified related applications, is set forth: 4,482,275; 3,367,724; 4,067,623; 3,424,352; 4,529,336; Re 24,716 (2,794,686); 3,007,744; 2,568,379; 2,400,194; 2,115,023; 3,230,016; 3,285,739; 3,289,396; 4,381,924; 2,479,093; 3,121,593; 3,159,432; 2,499,766; 3,411,832; 3,720,351; 2,806,781; 3,822,919; 699,405; 3,994,702; 4,018,588; 3,001,829; 2,715,551; 2,631,759; Japanese Pat. Nos. 98,030; 102,431; and 107,316; "Monitor Aeration Devices", Monitor Manufacturing Company, Elburn, Ill. 60119.

SUMMARY OF THE INVENTION

The invention relates to a high pressure, reliable, dry coal feed system.

The primary purpose of the present invent on relates to maintaining a uniform mass flow rate of a particulate solids and gas mixture discharged, under high temperature and pressure conditions, to a receiving reactor. In particular, this invention relates to pulverized coal discharged to a gasifier for the manufacture of synthesis gas.

Preferably, such an apparatus includes: means for introducing the mixture into a first containing means having converging walls, the containing means having at least one port formed at the apex thereof for discharging the mixture therefrom, means for selectively injecting gaseous fluid under pressure into the mixture, and means for discharging the particulate solids from the first containing means at a uniform mass flow rate.

Preferably, a method for controlling mass flow rate of solids to a reactor includes: introducing the mixture into a first containing means having converging walls, the containing means having at least one port formed at the apex thereof for discharging the mixture therefrom, selectively injecting gaseous fluid under pressure into the mixture, and discharging the particulate solids from the first containing means at a uniform mass flow rate.

The various features of novelty which characterize the invention are pointed out with particularity in the claims forming a part of this disclosure. For a better understanding of this invention, its operating advantages and specific objectives obtained by its uses, reference may be made to the accompanying drawings and descriptive matter in which there are illustrated preferred embodiments of the invention.

DESCRIPTION OF A PREFERRED EMBODIMENT

Figure 1:
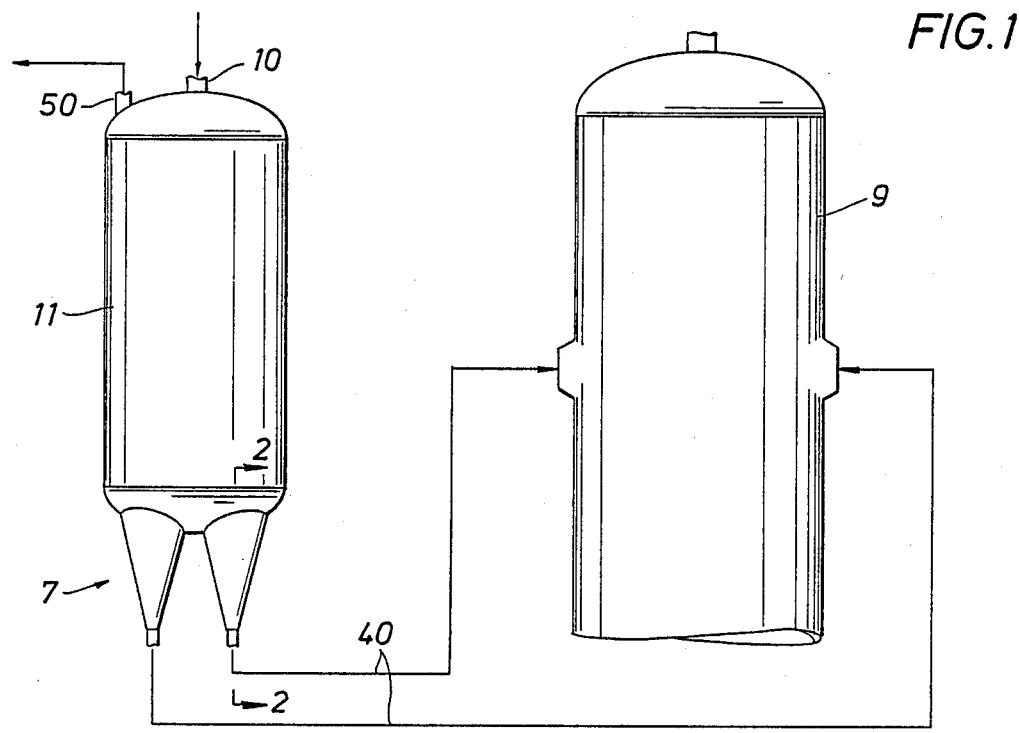
FIG. 1 illustrates a coal gasification system employing an embodiment of this invention.

Generation of synthesis gas occurs by partially combusting a carbonaceous fuel, such as coal, at relatively high temperatures in the range of 1000–3000° C. and at a pressure range of from about 1–70 bar, in the presence of oxygen or oxygen-containing gases in a coal gasification reactor, hereinafter referred to as a gasifier. Steam, carbon monoxide, carbon dioxide and oxygen-containing gases including air, oxygen-enriched air, and oxygen are optionally diluted with nitrogen and/or other inert gases.

In the present invention, the fuel and gas mixture is discharged from a feed vessel apparatus, preferably having multiple outlets, each outlet being in communication with at least one burner associated with the gasifier. Typically, a gasifier will have burners in diametrically opposing positions. Generally, the burners have their discharge ends positioned to introduce the resulting flame and the agent of combustion into the gasifier.

Of particular importance in the manufacture of synthesis gas is the uniform manner in which the particulate fuel is introduced to the burners within the gasifier. Fluctuations in the mass flow rate of coal being supplied to the burners of the gasifier are detrimental to gasifier's performance. For example, such fluctuations can cause inefficient combustion of fuel within the gasifier and damaging heat fluxes to the burner face which could result in thermal stresses on the burner face. If the mass flow rate of the particulate fuel fluctuates, zones of underheating are generated next to zones of overheating in the gasifier. As a result, in the zones of underheating the fuel is not completely gasified and in zones of overheating the fuel is completely converted into less valuable products, viz. carbon dioxide and water vapor. Additionally, localized high temperatures in the gasifier could damage the refractory lining which is normally arranged at the inner surface of the gasifier wall.

Since the residence time of the coal within the reaction zone of the reactor is approximately 5 seconds or less the coal mass flow rate should preferably be constant over periods of this order and preferably over shorter periods to maintain constant local conditions.

Various factors substantially affect the mass flow rate of the fuel being supplied to the burners. In particular, the discharging of the particulate fuel from a feed vessel apparatus and the transporting by conduit of the fuel from the vessel to the gasifier affect the mass flow rate of fuel to the gasifier. Specifically, fuel and gas mixtures having densities ranging from about 50–800 kg/m$^3$ transported through a conduit having a diameter less than 150 mm experience significant pressure drop due to the summation of various contributions such as frictional losses, restrictions, curvatures, etc., within the conduit.

The preferred embodiment of the invention utilizes a vessel having downwardly-converging walls at the lower end thereof, the vessel having at least one port at the apex and having a movable aerating means for aerating the solids within the converging walls of the vessel so as to maintain a uniform mass flow rate of the solids and gas mixture discharged to a gasifier. Gaseous fluids are injected into the aeration means at a selected pressure and rate to maintain a uniform mass flow rate of a particulate solids and gas mixture to be discharged to the receiving gasifier. Furthermore, use of the aerating means as an adjustable fluidic valve provides greater flexibility for operating the process under varying conditions, such as different coal types, coal moisture content, etc.

An advantage of the present invention is thai maintaining a uniform mass flow rate of a particulate solids and gas mixture to a gasifier prevents the occurrence of zones of underheating and overheating within the gasifier.

A further advantage of the present invention is the protection afforded the refractory lining within the gasifier due to the prevention of zones of underheating and overheating.

An additional advantage of the present invention is more efficient utilization of fuel in the production of synthesis gas.

Another advantage of the present invention is the capability of maintaining high suspension densities, e.g., greater than 200 kg/m$^3$, in the transport line from the vessel to the gasifier thereby reducing the consumption of aeration and pneumatic transport gas and avoiding dilution of the synthesis gas produced in the gasifier which would make the synthesis gas a less valuable product.

Although the invention is described hereinafter primarily with reference to pulverized coal, the method and apparatus according to the invention are also suitable for reactive solids and other finely divided solid fuels which could be partially combusted, such as lignite, anthracite, bituminous, brown coal, soot, petroleum coke, and the like. Preferably, the size of solid carbonaceous fuel is such that 90 percent by weight of the fuel has a particle size smaller than 100 mesh (A.S.T.M.). The invention is intended to accommodate mass flow rates in the range of 300–500,000 pounds per hour through 4–150 mm pipes.

Additionally, the present invention can be used for both granular, pulverized, and powdered solids such as resins, catalysts, fly ash, and electrostatic precipitator fines.

Having thus generally described the apparatus and method of the present invention, as well as its numerous advantages over the art, the following is a more detailed description thereof, given in accordance with specific reference to the drawings. However, the drawings are of a process flow type in which auxiliary equipment, such as pumps, compressors, cleaning devices, etc. are not shown. All values are merely exemplary or calculated.

Referring to FIG. 1, an apparatus for maintaining a uniform mass flow rate of a particulate solids and gas mixture discharged from a holding vessel apparatus, such as a feed hopper 11 operated at elevated pressures of 1–70 bar, via conduit 40 to a receiving reactor, such as a gasifier 9, generally includes means for introducing the mixture, such as an inlet port 10 into the feed hopper 11. The feed hopper 11 directs the material into generally cone-shaped receiving means shown generally at 7 and described more particularly with reference to FIG. 2.

Figure 3:
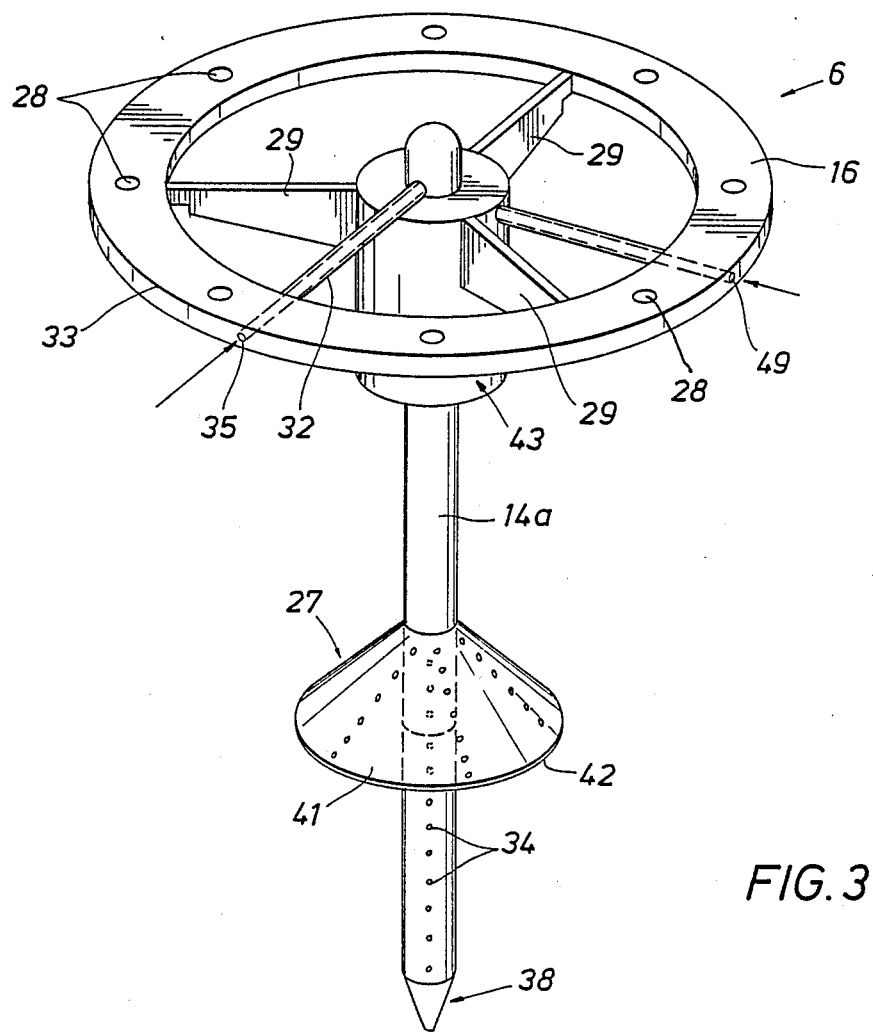
FIG. 3 is an isometric view of the aerating means of the present invention.
Figure 2:
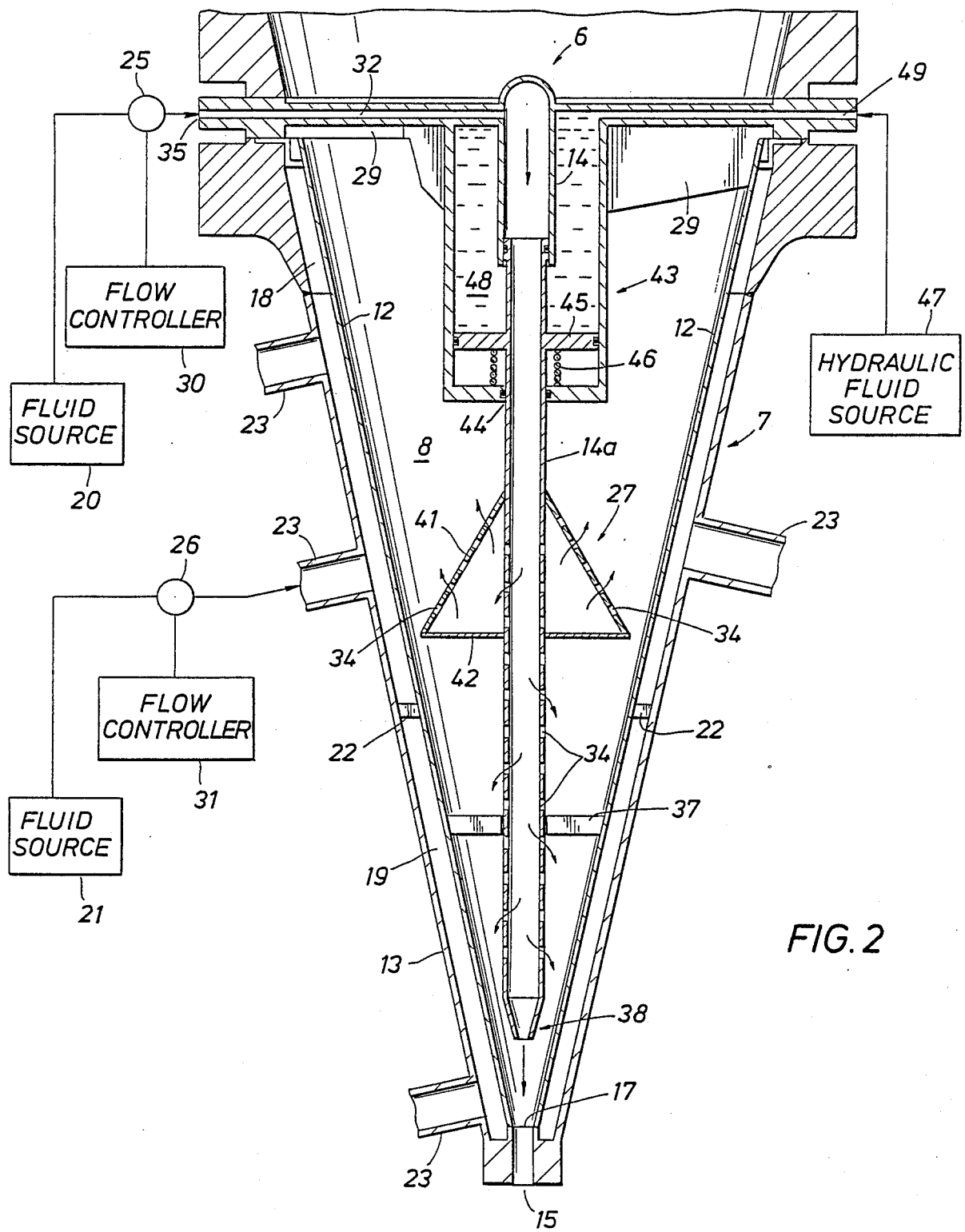
FIG. 2 is a cross-section of the preferred embodiment taken along line 2—2 of FIG. 1.

Referring now to FIGS. 2 and 3, an aeration device shown generally at 6 is shown for positioning in the receiving means 7 of the coal gasification system of FIG. 1. The aeration device 6 comprises a hollow shaft or tube 14, 14a, supported by a rigidly mounted mounting flange 16 at its upper end and having a generally cone-shaped aeration means 27 rigidly mounted approximately midway between its two ends. The mounting flange 16 has a plurality of holes 28 for mounting to the coal feed hopper 11. The mounting flange 16 is rigidly mounted to the aeration shaft 14 by means of gussets 29 which may be welded to the flange 16 and to the hollow shaft 14. A tube 32 extends from the periphery 33 of the flange 16 to the shaft 14 and communicates with the hollow interior thereof. Shaft 14a is an extension of, and is slideably connected to, the shaft 14 and has a plurality of exit holes 34 at the lower end thereof for communication of gaseous fluid (indicated by the arrows) flowing in shaft 14, 14a with the coal mixture traveling through the receiving means 7. A gaseous fluid is forced under pressure into the mouth 35 of tube 32. Since the top end 36 of the aeration tube 14 is closed, the gaseous fluid travels down the aeration tube 14 and 14a and exits through the holes 34 thereby aerating the coal mixture in the receiving means 7. Aeration means 27 is welded to the tube 14a, thus rises and falls therewith. The walls 41 of aeration means 27 and the walls 12 of the liner 8 thus define a fluidic valve for the carbonaceous fuel flowing through receiving means 7. Guide means 37 slideably receives aeration shaft 14a for guiding and centering the aeration device 6 in the receiving means 7 but does not substantially obstruct the flow of the carbonaceous fuel.

In a preferred embodiment, FIGS. 2 and 3, aeration means 27 may be a hollow, cone-shaped device whose upward sloping walls 41 are perforated by holes 34 but whose base 42 is solid. Some of the gaseous aeration fluids in the aeration tube 14a are directed into the interior of the cone 27 and exit through the perforations 34 in the walls 41 thereby further aerating the mixture in the receiving means 7.

The lower end 38 of aeration tube 14a may be tapered so as to be receivable into the discharge port 17 of the receiving means 7. The aeration tube 14a is made to be selectively movable so as to move into (and away from) the port 17 for seating (and unseating) therein. The stinger 38 and port 17 thereby form a second fluidic valve for further controlling the flow of material from receiving means 7 and into transport line 40.

The aeration tube 14a, and the aeration cone 27 fixedly attached thereto, is movable in its longitudinal direction by means of the hydraulic cylinder generally shown at 43 which may form a part of the mounting flange 16 and gussets 29. Aeration shaft 14a is slideably received into hydraulic cylinder 43 through an opening 44 and is fixedly attached, such as by welding, to piston 45. A portion of aeration shaft 14a extends above piston 45 and is slideably (telescopically) received into tube 14. Piston 45 is biased in its upward position by spring 46 and its position within the cylinder 43 is controlled by fluid pressure from hydraulic fluid source 47 into the chamber 48 of hydraulic cylinder 43 through inlet port 49. The position of the aeration device 6 is thus controlled by fluid pressure from source 47. Of course, suitable seal means must be provided at all slideable interfaces as is well known to those skilled in the art.

The preferred embodiments, as described above, utilize the walls of the receiving means 7 to contain and direct the mixture through the discharge port 17 and into the transport line 40. It may be necessary, or preferable in some instances, to utilize the aeration tube 14 in combination with a liner 8 within the receiving means 7 wherein the walls 12 of the liner 8 are completely or partially permeable or wherein the walls 12 of the liner 8 use a plurality of porous plugs (as in Assignee's previously mentioned copending application Ser. No. 209,602).

Referring now to FIG. 2, the receiving means 7 may be lined with a liner or inner shell 8 whose walls may ba permeable, or porous, to gaseous fluids used for aerating the mixture therein. The liner 8 has converging walls 12 forming an included angle of less than about 120 degrees, preferably less than about 90 degrees, and converging toward at least one port 17 formed at the apex thereof for discharging the mixture therefrom.

The receiving means 7 may comprise a jacket 13 which surrounds the liner 8 and is mounted to form a substantially enclosed space, or manifold, between the walls 12 of the liner 8 and the jacket 13. The jacket 13 has at least one outlet port 15 at the lower end thereof which is in axial alignment with the discharge port 17 of the liner 8 for discharging particles therefrom.

Means for isolating specific areas, preferably first and second areas 18, 19, respectively, located outside and circumferentially about substantially adjacent permeable portions of walls 12, such as a partition 22 within the substantially enclosed space between the jacket 13 and the walls 12, forms at least two substantially enclosed compartments 18, 19. The jacket 13 includes means for selectively injecting gaseous fluid under pressure into tube 32 via inlet port 35 and into first and second areas 18, 19, such as via inlet port 23 from pressurized fluid sources 20, 21, respectively. Although fluid sources 20, 21 are preferably separate sources, it is recognized by those skilled in the art that gaseous fluid may be supplied from the same source. Jacket 13 must also provide inlet port means 49 for supplying hydraulic pressure to the cylinder 43 from source 47.

The compartments formed within the substantially enclosed space between the walls 12 and the jacket 13 permit gaseous fluids, possibly having different densities, such as nitrogen or other inert gas, and synthesis gas, which is mainly carbon monoxide hydrogen, and water, to be selectively injected into the compartments. The gas injected into the first area 18 may be more, equal to or less dense than the gas injected into second area 19. Preferably, the gas injected into area 18 would be inert and the gas injected into area 19 would be synthesis gas. The gas injected into area 18 would preferentially flow upwards and could be vented to control the pressure in the feed hopper 11 whereas the gas injected into area 19 flows preferentially downward and is transported to the gasifier 9.

The liner 8 is preferably made of a heavy, solid material such as stainless steel or "alloy 20" and may be lined partially or completely with a porous material which may be metallic or nonmetalic, such as sintered powdered metal, woven stainless steel, or porous ceramic, depending upon the operating conditions and type of coal used in the process. The porous material has a selected permeability, preferably in the range of 0.01 to 10 acfm/ft2–psi. The porous material facilitates the uniform distribution of gaseous fluid injected from the pressurized sources into the liner 3 and prevents bridging of the particulate solids discharged from the liner 8 via discharge port 17.

The pore size of the porous material is based on, among other factors, the type of coal used. To allow greater operating flexibility to use various types of coal requiring differing pore sizes, the liner 8 is preferably interchangeable with another liner having porous material of a different permeability than the first liner 8.

Furthermore, introduction of the gaseous fluid into the pores of the porous material imparts a pressure restriction to the gaseous fluid thus ensuring an even flow distribution of the fluid throughout the porous material of the walls 12 of the liner 8. Similarly, the porous material serves to control the bulk density of the mixture within the liner 8 and the discharge rate of the mixture leaving the hopper 11 via port 17.

Where the porous material comprises a plurality of plugs, the holes (and plugs) are arranged to provide proper aeration for differing particulate matter and characteristics thereof. For example, the holes of the liner 8 may be arranged in three general zones of openness, a top zone which is 3% open, a middle or bridging zone which is 10% open, and a bottom zone which is 5% open. The entire liner 8 may have approximately 200 holes, the diameter of each being on the order of 14 mm.

The flow rate and direction of the gaseous fluid, preferably nitrogen and synthesis gas, injected under pressure into aeration tube 32 and into the first and second areas 18, 19, respectively, are controlled, by using flow controllers, 30, 31, at a rate, measured by flowmeters 25, 26, sufficient to aerate the particulate solids in proximity to aeration tube 14a, conical aeration means 27 and the porous material of walls 12, but at a rate below that which would fluidize the particulate solids located above the porous material, i.e., above receiving means 7. It is undesirable to inject the gases at a rate sufficient to fluidize the particles above the porous material, as is typically done in conventional systems, because it results in more inert gas diluting the synthesis gas produced in the gasifier 9 and thus yielding a less valuable product.

The slip velocity above the aeration cone 8, i.e., the relative superficial velocity between the gas and the goal within the hopper, should be less than 50% of the fluidization velocity and preferably near zero. Also, fluidization of the particles increases fluctuations of the mass flow rate of solids discharged from the coal feed hopper 11.

Additionally, the flow rates of the gaseous fluid from the fluid sources should not exceed the terminal falling velocity of the solids contained within the feed hopper 11. Terminal falling velocity is defined as the velocity at which the drag forces on a solid particle due to the flow of gases upward equals the downward force on the particle due to gravity. If the flow rates of the gases exceed the terminal falling velocity, then the solids will be discharged via the vent 50 rather than the discharge port 17.

Preferably, the flow rates of these gases from the sources 20, 21 are independently controllable by flow controllers 30, 31 and flow meters 25, 26 which permits the separate control of the amount of gas flowing upward and the amount of gas flowing downward relative to the flow of the coal.

For example, for a uniform mass flow rate of particulate solids and gas mixture of 2000 kg/hr having a suspension density of 450 kg/m$^3$ discharged from the feed hopper 11, the rate of injecting nitrogen in the first area would be approximately 100 kg/hr. Should this rate be exceeded, then the suspension density would be less than 450 kg/m$^3$ and the synthesis gas produced in the gasifier 9 would be diluted by the nitrogen from the gas source. Additionally, should this rate be somewhat less than the selected rate, then the suspension density would be substantially higher than 450 kg/m$^3$. Depending on the material and operating conditions, this situation could lead to less than stable flow.

Furthermore, the gaseous fluid may be injected in various directions and elevations to control the pressure and velocity profile which exists at the discharge port 17. Depending on the physical properties of the particles being transported, it may be necessary to have more than two compartments or to inject gas above the compartmented region.

This selective injection provides for separate control of the mixture density within the feed hopper 11 and the discharge density of the mixture leaving the hopper 11 via outlet port 15. As a result, the discharge port 15 of the hopper 11 is much smaller than conventional technologies for suspension densities of 200–500 kg/m$^3$ preferred in the present invention.

The diameter of the discharge port 17 in the present invention is about 4 mm to about 150 mm for a solids and gas mixture having a suspension density of about 200–500 kg/m$^3$. This diameter is larger than the maximum bridging diameter of the aerated particulate solids to prevent bridging of the solids as they exit the discharge port 17. Conventional coal feed systems using gravity flow of solids assisted by aeration to break up bridging typically have a suspension density of less than 200 kg/m$^3$ at the discharge outet of the feed hopper and a corresponding feed vessel apparatus discharge port diameter of greater than about 150 mm. Diameters of the discharge port 17 greater than about 150 mm for a given mass flow rate used in the present invention are not desirable because either the velocity or suspension density would fall below the desired limits thus resulting in fluctuations of the mass flow rate of the coal and gas mixture to the gasifier 9.

Thus, the aeration device 6 of the present invention, in conjunction with the walls 12 of the liner 8 and the discharge port 17, acts like a fluidic valve to control the particulate discharge rate and thereby eliminates the need for troublesome valves in transport hardware between the discharge of the hopper 11 and the gasifier 9.

Furthermore, the present invention may be provided with means for venting gas from the upper end of the hopper 11, say via the solids in the feed hopper 11 of approximately 2mm/sec and thereby eliminate local bridging of the solids and provide smoother flow to the discharge port 17.

The foregoing description of the invention is merely intended to be explanatory thereof, and various changes in the details of the described method and apparatus may be within the scope of the appended claims without departing from the spirit of the invention.

What is claimed is:

1. An apparatus for maintaining a uniform mass flow rate of a particulate solids and gas mixture discharged from a holding vessel to a receiving reactor, said apparatus comprising:

means for introducing said mixture into a containing means having a downwardly converging wall which forms at least one port at the apex thereof for discharging said mixture therefrom;

first tubing means movably secured within said containing means and in axial alignment with said discharge port;

second tubing means within said containing means slideably connected to said first tubing means such that the interior passages of said first and second tubing means are in fluid communication with each other;

means for selectively injecting gaseous fluid under pressure into said second tubing means;

a plurality of aeration ports selectively located in said first tubing means and communicating with the interior passageway therein for discharging said gaseous fluid into said particulate solids and gas mixture;

means for selectively moving said first tubing means in axial relation to said discharge port; and means for discharging said particulate solids from said containing means.

2. The apparatus of claim 1 wherein said means for selectively moving is a hydraulic cylinder.

3. The apparatus of claim 2 further comprising reversing means for reversing the flow direction of at least a portion of said gaseous fluid.

4. The apparatus of claim 3 wherein said reversing means is an upwardly extending hollow cone surrounding at least a portion of said first tubing means, the upwardly extending wall thereof being selectively perforated and wherein said hollow interior of said cone is in fluid communication with at least a portion of said aeration ports in said first tubing means.

5. The apparatus of claim 1 further comprising jacket means for enclosing said downwardly converging wall of said containing means thereby forming a compartment therebetween, means for injecting a gaseous fluid into said compartment and wherein at least a portion of said wall of said containing means is porous to said gaseous fluids.

6. The apparatus of claim 2 further comprising jacket means for enclosing said downwardly converging wall of said containing means thereby forming a compartment therebetween, means for injecting a gaseous fluid into said compartment and wherein at least a portion of said wall of said containing means is porous to said gaseous fluids.

7. The apparatus of claim 3 further comprising jacket means for enclosing said downwardly converging wall of said containing means thereby forming a compartment therebetween, means for injecting a gaseous fluid into said compartment and wherein at least a portion of said wall of said containing means is porous to said gaseous fluids.

8. The apparatus of claim 4 further comprising jacket means for enclosing said downwardly converging wall of said containing means thereby forming a compartment therebetween, means for injecting a gaseous fluid into said compartment and wherein at least a portion of said wall of said containing means is porous to said gaseous fluids.

9. The apparatus of claim 5 further comprising means for dividing said compartment into a plurality of compartments.

10. An apparatus for maintaining a uniform mass flow rate of a particulate solids and gas mixture discharged from a holding vessel to a receiving reactor, said apparatus comprising:
containing means having a converging wall wherein said wall converges toward at least one port formed at the apex thereof for discharging said solids and gas mixture therefrom and wherein at least a portion of said wall is porous to gaseous fluids whereby said particulate solids in proximity to said wall may be aerated;
a jacket positioned around said containing means and mounted so as to form a substantially enclosed space between said containing means and said jacket, said jacket having at least one outlet port at the lower end thereof in axial alignment with the discharge port of said containing means;
tubing means within said containing means for aerating a portion of said particulate solids within said containing means;
means for selectively moving said tubing means in axial relation to said port;
means for injecting gaseous fluids into said tubing means and into said enclosed space; and
means for independently controlling the flow rate of said gaseous fluids into said tubing means and said enclosed space under pressures and at a rate sufficient to fluidize the particulate solids within said containing means but at a rate below that which would fluidize the particulate solids located above said containing means.

11. The apparatus of claim 10 wherein said means for selectively moving is a hydraulic cylinder.

12. The apparatus of claim 11 wherein said substantially enclosed space is divided into a plurality of substantially enclosed compartments and said gaseous fluid is injected into each of said compartments.

13. The apparatus of claim 11 wherein said gaseous fluid includes more than one component, said components being of different densities.

14. The apparatus of claim 11 wherein the diameter of said discharge port is about 4 mm to at least about 150 mm for a solids and gas mixture having a suspension density of about 50–800 $kg/m^3$.

15. The apparatus of claim 11 wherein the included angle of said converging wall is less than about 120 degrees.

16. The apparatus of claim 11 further including means for injecting said gaseous fluid at a selected rate not to exceed the terminal falling velocity of the solids within said holding vessel apparatus.

17. The apparatus of claim 16 further including means for controlling the slip velocity of said gaseous fluid under pressure at a rate below a minimum fluidization velocity of said particulate solids within said holding vessel apparatus above said containing means.

18. The apparatus of claim 11 further including means for maintaining a volume of solids and gas mixture within said holding vessel apparatus of at least about 50 percent by volume of said holding vessel apparatus.

19. The apparatus of claim 17 wherein said means for controlling includes means for maintaining a velocity of at least about 2 mm/s within said holding vessel apparatus and wherein said holding vessel apparatus has a diameter of about 1 meter.

20. The apparatus of claim 10 further including means for venting gas from said holding vessel apparatus.

* * * * *